US010594836B2

(12) United States Patent
Walker et al.

(10) Patent No.: US 10,594,836 B2
(45) Date of Patent: Mar. 17, 2020

(54) AUTOMATIC DETECTION OF HUMAN AND NON-HUMAN ACTIVITY

(71) Applicant: MICROSOFT TECHNOLOGY LICENSING, LLC, Redmond, WA (US)

(72) Inventors: Toby Walker, Cambridge, MA (US); Sarvesh Nagpal, Redmond, WA (US); Ron Kohavi, Issaquah, WA (US); Brian Frasca, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 259 days.

(21) Appl. No.: 15/639,938

(22) Filed: Jun. 30, 2017

(65) Prior Publication Data

US 2019/0007523 A1 Jan. 3, 2019

(51) Int. Cl.
*H04L 29/08* (2006.01)
*G06F 21/31* (2013.01)
*H04L 12/24* (2006.01)

(52) U.S. Cl.
CPC .......... *H04L 67/327* (2013.01); *G06F 21/316* (2013.01); *H04L 41/5022* (2013.01); *H04L 67/22* (2013.01); *H04L 67/28* (2013.01); *G06F 2221/2133* (2013.01); *G06F 2221/2139* (2013.01)

(58) Field of Classification Search
CPC .................................................... H04L 67/327
USPC ........................................................ 709/202
See application file for complete search history.

(56) References Cited

U.S. PATENT DOCUMENTS

| | | | | |
|---|---|---|---|---|
| 6,064,974 | A * | 5/2000 | Broekhuijsen | G06Q 10/06 705/7.22 |
| 8,140,518 | B2 | 3/2012 | Dasdan et al. | |
| 8,667,566 | B2 * | 3/2014 | Lazar | G06F 21/31 726/21 |
| 9,519,766 | B1 * | 12/2016 | Bhosale | G06F 21/31 |
| 9,595,008 | B1 * | 3/2017 | Heikell | G06N 7/005 |
| 9,600,340 | B1 * | 3/2017 | Mundar | G06F 16/24542 |
| 9,619,642 | B2 * | 4/2017 | Kalra | G06F 21/36 |
| 9,723,005 | B1 * | 8/2017 | McInerny | H04L 63/10 |
| 10,097,583 | B1 * | 10/2018 | Demirjian | H04L 63/20 |
| 2006/0026246 | A1 * | 2/2006 | Fukuhara | H04L 51/12 709/206 |

(Continued)

OTHER PUBLICATIONS

Microsoft Computer Dictionary, "sensor", 5th edition, 2002, p. 472 (Year: 2002).*

(Continued)

*Primary Examiner* — Ondrej C Vostal
(74) *Attorney, Agent, or Firm* — Shook, Hardy & Bacon LLP

(57) ABSTRACT

Systems, methods, and computer-readable storage media are provided for determining whether a user is a human agent or a non-human agent. A user is initially classified as a human or non-human agent based on user request properties. Sensor data is received from the user device and used to determine whether the user is to be reclassified as a human agent or non-human agent. Based on the sensor data, the user is then reclassified as a human agent or non-human agent. A service is adapted based on the classification.

20 Claims, 5 Drawing Sheets

(56) References Cited

U.S. PATENT DOCUMENTS

| | | | |
|---|---|---|---|
| 2008/0066014 A1* | 3/2008 | Misra | G06F 21/36 715/846 |
| 2008/0301090 A1 | 12/2008 | Sadagopan et al. | |
| 2009/0265317 A1 | 10/2009 | Buehrer et al. | |
| 2009/0319270 A1* | 12/2009 | Gross | G10L 15/22 704/246 |
| 2009/0328163 A1* | 12/2009 | Preece | G06F 21/36 726/5 |
| 2010/0077209 A1* | 3/2010 | Broder | G06F 21/46 713/168 |
| 2010/0262457 A1* | 10/2010 | House | G06Q 30/02 705/7.29 |
| 2010/0287229 A1* | 11/2010 | Hauser | G06F 21/316 709/203 |
| 2011/0131652 A1* | 6/2011 | Robinson | H04L 63/1408 726/22 |
| 2011/0208716 A1* | 8/2011 | Liu | G06F 21/36 707/710 |
| 2011/0246634 A1* | 10/2011 | Liu | H04L 29/12066 709/223 |
| 2012/0084450 A1* | 4/2012 | Nagamati | G06F 21/31 709/229 |
| 2012/0189194 A1* | 7/2012 | Srivastava | G06F 21/316 382/161 |
| 2012/0191691 A1 | 7/2012 | Hansen | |
| 2013/0133055 A1* | 5/2013 | Ali | H04L 63/0861 726/7 |
| 2013/0205370 A1* | 8/2013 | Kalgi | H04W 12/10 726/3 |
| 2013/0276125 A1* | 10/2013 | Bailey | H04L 63/1433 726/25 |
| 2014/0068735 A1* | 3/2014 | Marinov | G06F 21/31 726/7 |
| 2014/0196133 A1* | 7/2014 | Shuster | H04L 63/126 726/7 |
| 2014/0245798 A1* | 9/2014 | Beckman | E05B 19/00 70/14 |
| 2015/0128236 A1* | 5/2015 | Moscicki | H04L 63/0876 726/7 |
| 2015/0180857 A1* | 6/2015 | Schulman | H04L 63/0807 726/9 |
| 2015/0212251 A1* | 7/2015 | Shih | G02B 6/0068 362/609 |
| 2015/0281263 A1* | 10/2015 | McLaughlin | G06Q 30/0201 726/22 |
| 2016/0055329 A1* | 2/2016 | Akula | G06F 21/36 726/7 |
| 2016/0070902 A1* | 3/2016 | Malone | G06F 21/316 726/3 |
| 2016/0180073 A1* | 6/2016 | Zhou | H04L 63/0876 726/27 |
| 2016/0191554 A1* | 6/2016 | Kaminsky | H04L 63/1416 726/23 |
| 2016/0261586 A1* | 9/2016 | Huang | G06T 11/60 |
| 2016/0269402 A1* | 9/2016 | Carter | H04L 9/0816 |
| 2017/0011212 A1* | 1/2017 | Rowlingson | G06F 21/36 |
| 2017/0068808 A1* | 3/2017 | Kaladgi | G06F 21/36 |
| 2017/0068899 A1* | 3/2017 | Laptev | G06F 16/954 |
| 2017/0078319 A1* | 3/2017 | Thompson | H04L 63/1433 |
| 2017/0090569 A1* | 3/2017 | Levesque | G06F 3/016 |
| 2017/0104748 A1* | 4/2017 | Koster | H04L 63/0823 |
| 2017/0185758 A1* | 6/2017 | Oliker | G06F 21/316 |
| 2017/0237820 A1* | 8/2017 | Scarborough | H04L 63/0853 709/226 |
| 2018/0102947 A1* | 4/2018 | Bhaya | H04L 41/5003 |
| 2018/0114001 A1* | 4/2018 | Jain | G06F 21/31 |
| 2018/0341779 A1* | 11/2018 | Sawant | H04N 21/00 |

OTHER PUBLICATIONS

"International Search Report and Written Opinion Issued in PCT Application No. PCT/US2018/034512", dated Sep. 4, 2018, 10 Pages.

Buehrer, et al., "Classification of Automated Web Traffic", In Proceedings of Weaving Services and People on the World Wide Web, Jan. 1, 2009, pp. 1-27.

Wilinsky, Alayne, "AdTech Has Another Problem: Low-quality Traffic", https://zvelo.com/adtech-has-another-problem-low-quality-traffic/, Published on: May 23, 2016, 2 pages.

Terman, Elias, "The State of Online Advertising Fraud & Bot Traffic—2015 Study", https://resources.distilnetworks.com/all-blog-posts/the-state-of-online-advertising-fraud-bot-traffic-2015-study, Retrieved on: Mar. 23, 2017, 6 pages.

* cited by examiner

AUTOMATIC DETECTION OF HUMAN AND NON-HUMAN ACTIVITY

BACKGROUND

A service can receive requests that consume resources of the service from computing agents, including both automated traffic and human traffic. In some cases, due to the volume of requests received from automated traffic, for example, a service must devote a substantial amount of resources to the automated, or non-human, traffic. However, since computing resources are limited and/or are provided at a cost to the service provider, devoting a large amount of resources to the automated traffic may have a negative effect on the service.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

In various embodiments, systems, methods, and computer-readable storage media are provided for automatic detection of human and non-human activity. For example, a user is classified as a human agent or non-human agent based on user request properties. The activity of the user is monitored and based on detection of activities indicative of a human agent or non-human agent, the classification of the user can be dynamically classified as either a human or non-human agent. The user is allowed to perform an action or receive a quality of service based on the classification. Thus, the service can switch a user's classification and response level based on classification and consider the cost of misclassifying a human as a non-human agent and a human agent without affecting the quality of the user experience and vice versa.

BRIEF DESCRIPTION OF THE DRAWINGS

Aspects of the disclosure are described in detail below with reference to the attached drawing figures, wherein.

DETAILED DESCRIPTION

Figure 1:
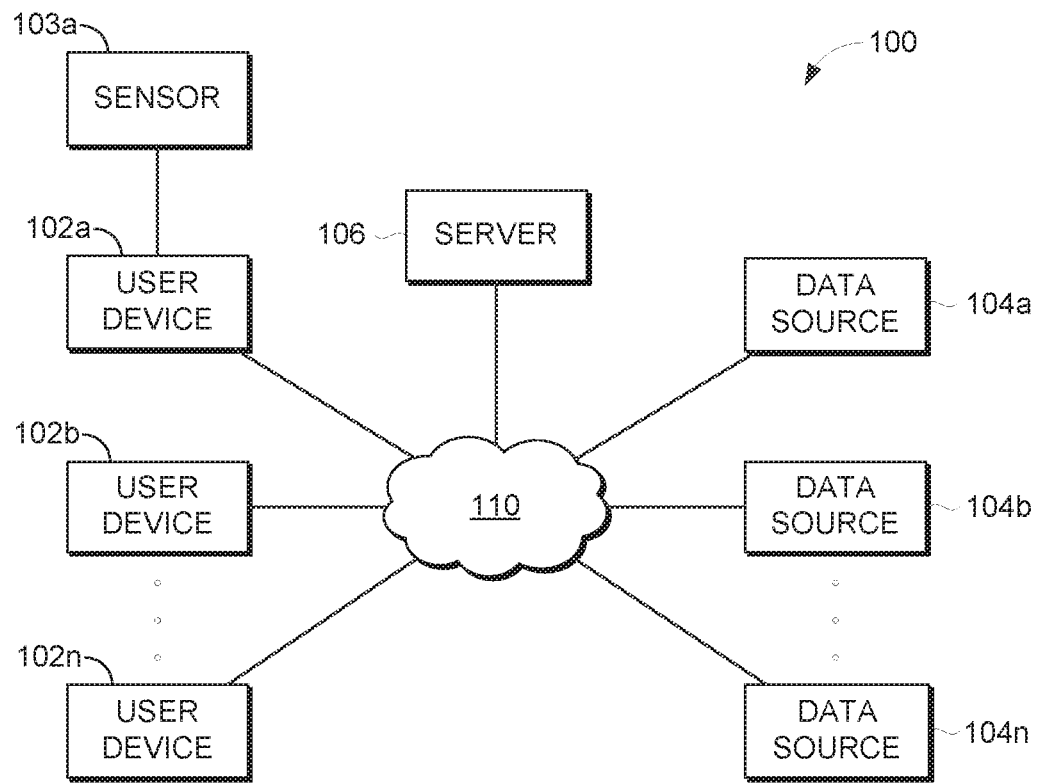
FIG. 1 is a block diagram of an example operating environment suitable for implementations of the present disclosure.

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for automatic detection of human and non-human activity. By way of example and not limitation, a user is initially classified as a human agent or non-human agent based on user request properties. The user activity is monitored, and based on the activities of the user indicative of a human agent or non-human agent, the user may be reclassified as a human or non-human agent. For example, if activities indicative of a human agent are detected, the user can be reclassified as a human agent from a non-human agent classification. Furthermore, based on the classification of the user, a different quality of service can be provided to the user to optimize the user's experience.

A service is a process or system that interacts with a user to provide responses to that user mediated by a physical or logical device. For example, a web site or an application on mobile client device can be a service. A service may wish to distinguish between a human agent and a non-human agent due to the type of interaction of the user. For example, a human agent may view videos or other multimedia content hosted on a web page. A non-human agent, on the other hand, may just obtain data from the web page or download videos from the site for unauthorized sharing. By distinguishing between a human agent and a non-human agent, the service may maximize resources and benefits for the service and its human users. For example, a human agent may receive a quality of service that is resource intensive and a non-human may receive a quality of service that is less resource intensive.

There currently exist means for detecting whether a user is a human or non-human agent. For example, a popular means of detecting whether a user is a human or non-human agent is to provide a CAPTCHA to the user. If the user successfully authenticates themselves via the CAPTCHA, the user can proceed with the service. Otherwise, if the user is not successfully authenticated, the user is classified as a non-human agent, and may be prevented from utilizing the service. The existing means have certain advantages and disadvantages. One disadvantage, for example, is that a user having to authenticate themselves may be burdensome to a human agent. If a human agent needs to type in a set of character or perform some other action to authenticate themselves, the human agent may instead choose to quit the service causing to service to lose membership/viewership. Furthermore, if a human agent is incorrectly classified as a non-human agent, preventing them from accessing the service, the misclassification may be costly to the service provider. On the other hand, classifying a non-human agent as a human agent also has the disadvantage of not optimizing resource allocation since a certain amount of resources would need to be devoted to non-human agents. The service provider may need to determine the tradeoff between over-classifying the user as a non-human agent, causing human agents to no longer use the service, or classifying the user as a human agent, causing the service to expend additional resource to satisfy the requests of the non-human agent.

As an illustrative example, a search engine may receive requests from both human and non-human agents. The search engine may wish to provide visually appealing, highly relevant, and feature-rich content to human agents and quickly retrievable and lightweight content to non-human agents. If the search engine provides the visually appealing, highly relevant, and feature-rich content to a non-human agent, it may need to expend resources that would otherwise be available for a human agent. Alternatively, if the search engine provides the quickly retrievable and lightweight content to a human agent, it may negatively affect the user's experience, causing the human agent to use other services instead. Thus, it may be important for the search engine to be able to correctly classify the user as a human agent or non-human agent with a high degree of accuracy.

As another illustrative example, an online game may receive requests from both human and non-human agents. The game may wish to prevent non-human agents from playing the game. However, if the user is incorrectly classified as a non-human agent, the user can be prevented from playing the game causing the game provider to lose a subscriber or a legitimate player of the game.

Accordingly, systems, methods, and computer-readable storage media are provided for automatic detection of human and non-human activity, so that, e.g., different qualities of service can be provide to the user based on their classification as a human or non-human agent.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user computing devices, such as user devices 102a and 102b through 102n; server 105; and network 110. It should be understood that environment 100 shown in FIG. 1 is an example of one suitable operating environment. Each of the components shown in FIG. 1 may be implemented via any type of computing device, such as computing device 500 described in connection to FIG. 5, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 105 may be provided via multiple devices arranged in a distributed environment that collectively provide the functionality described herein. Additionally, other components not shown may also be included within the distributed environment.

User devices 102a and 102b through 102n can be client user devices on the client-side of operating environment 100, while server 105 can be on the server-side of operating environment 100. Server 105 can comprise server-side software designed to work in conjunction with client-side software on user devices 102a and 102b through 102n, so as to implement any combination of the features and functionalities discussed in the present disclosure. This division of operating environment 100 is provided to illustrate one example of a suitable environment, and there is no requirement for each implementation that any combination of server 105 and user devices 102a and 102b through 102n remain as separate entities.

User devices 102a and 102b through 102n may comprise any type of computing device capable of use by a user. For example, in one embodiment, user devices 102a through 102n may be the type of computing device described in relation to FIG. 5 herein. By way of example and not limitation, a user device may be embodied as a personal computer (PC), a laptop computer, a mobile or mobile device, a smartphone, a tablet computer, a smart watch, a wearable computer, a personal digital assistant (PDA) device, a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized meter or measuring device, an appliance, a consumer electronic device, a workstation, or any combination of these delineated devices, a combination of these devices, or any other suitable computer device.

Server 105 can be a web server configured to provide content to user devices 102a and 102b through 102n. The web pages can contain static content (e.g., previously configured and stored on the web server), dynamic content (e.g., created in response to a user input or other event), or both static and dynamic content. Furthermore, server 105 can retrieve content from one or more content servers (not illustrated) and providing the content as a web page to user devices 102a and 102b through 102n. It should be understood that server 105 is not limited to web page content and can be any content deliverable to user devices 102a and 102b through 102n.

Sensor 103a may comprise any type of sensor configured to capture a user's interaction with any one of user devices 102b through 102n. For example, sensor 103a can capture the movements and button presses of a pointer. It should be understood that the data captured by sensor 103a is different from programmatic data that represents an event. For example, a user device can receive an event, such as a pointer click, that is generated programmatically. However, sensor 103a captures the actual press of a pointer button, or similar gesture using another modality like touch, instead of the generated pointer click event. Thus, if a non-human agent sends pointer events to the user device or causes the user device to trigger a pointer event, this event data is not captured from sensor 103a. It should be understood that although FIG. 1 shows only user device 102a comprising sensor 103a, this is shown for illustrative purposes only, and any of user devices 102b through 102n can also comprise a sensor. Furthermore, any of user devices 102b through 102n can comprise more than one sensor.

Data sources 104a and 104b through 104n may comprise data sources and/or data systems, which are configured to make data available to any of the various constituents of operating environment 100, or system 200 described in connection to FIG. 2. Data sources 104a and 104b through 104n may be discrete from user devices 102a and 102b through 102n and server 106 or may be incorporated and/or integrated into at least one of those components.

Figure 2:
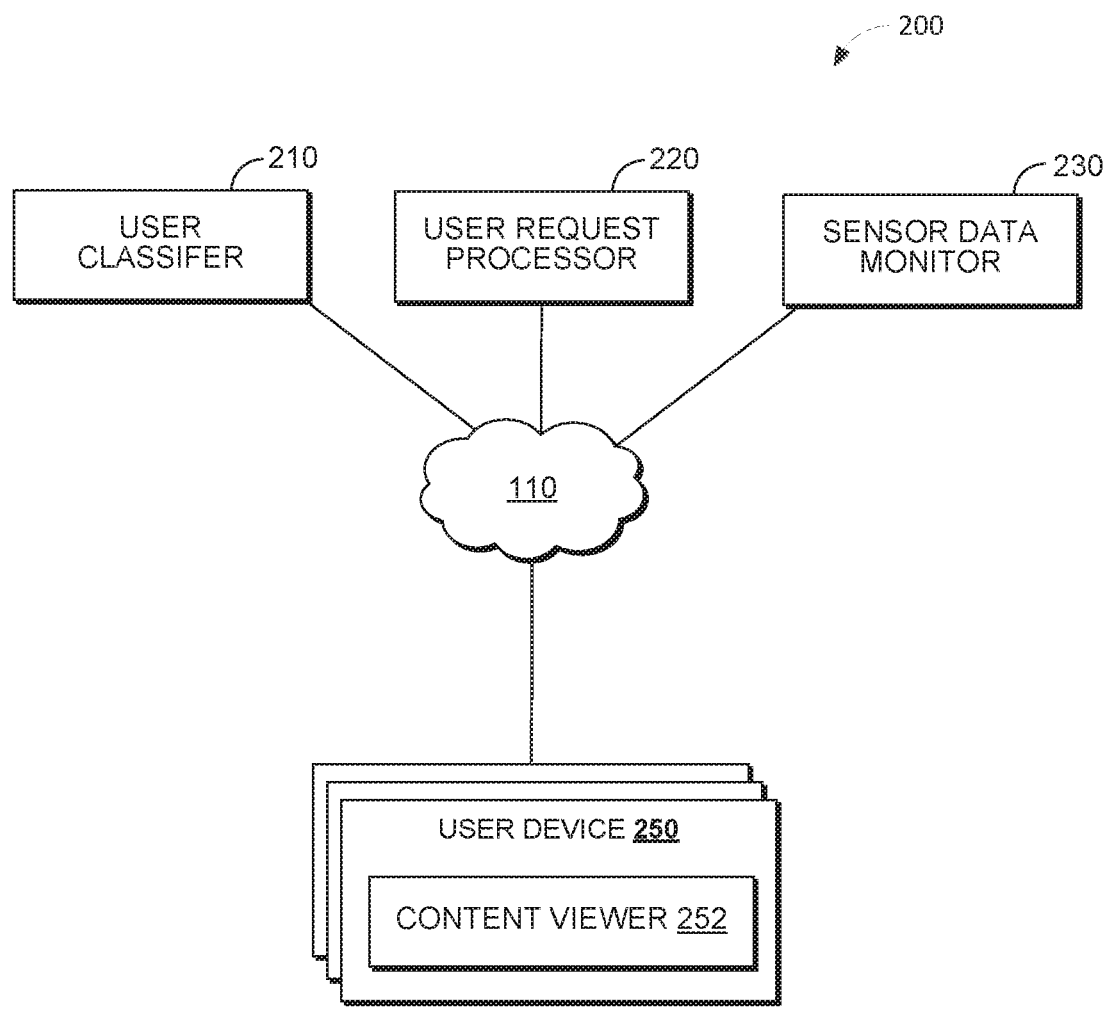
FIG. 2 is a diagram depicting an example computing architecture suitable for implementing aspects of the present disclosure.

Operating environment 100 can be utilized to implement one or more of the components of system 200, described in FIG. 2, including components for initially classifying a user as a human or non-human agent based on user request properties, monitoring activities of the user indicative of a human or non-human agent, reclassifying a user as a human or non-human agent based on the monitored activities, and providing a quality of service based on the classification of the user. Operating environment 100 also can be utilized for implementing aspects of methods 300 and 400 in FIGS. 3 and 4, respectively.

Referring now to FIG. 2, with FIG. 1, a block diagram is provided showing aspects of an example computing system architecture suitable for implementing an embodiment of the disclosure and designated generally as system 200. System 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Example system 200 includes network 110, which is described in connection to FIG. 1, and which communicatively couples components of system 200 including user classifier 210, user request processor 220, sensor data monitor 230, and one or more user device(s) 250. User classifier 210, user request processor 220, sensor data monitor 230, and subcomponents of user device(s) 250 may be embodied as a set of compiled computer instructions or functions, program modules, computer software services, or an arrangement of processes carried out on one or more computer systems, such as computing device 500 described in connection to FIG. 5, for example.

Continuing with FIG. 2, user classifier 210 is generally responsible for classifying a user as a human agent or non-human agent. For example, user classifier can use data from user request processor 220 and/or sensor data monitor 230 to classify the user as a human agent or non-human agent. It should be understood that a classification of a user a human agent or non-human agent is for illustrative purposes and that user classifier 210 can have other classifications of a user. For example, a service can have different tiers, and each of the classifications of the user can correspond to a tier. Furthermore, the classifications need not be a human agent and non-human agent, but instead the service may assign a score to the user, indicating the likelihood of the user being a human agent, where the score determine what quality of service is provided to the user. Thus, multiple thresholds or ranges can be used to classify the user. Based on the classification, a different quality of service can be provided to the user. For example, if the user is classified as a human agent, the service can provide the service with a full set of features, whereas a non-human agent may receive something less than the entire set of features of the service. It should be understood that the classification of the user is not limited to a human agent and non-human agent and there may be multiple levels of service.

In some embodiments, user classifier 210 can use history of interactions, past sensor data, and past classifications to classify the user as a human agent or non-human agent. Furthermore, user classifier 210 can use information from multiple users.

In some embodiments, the classification of the user as a human agent or non-human agent is performed on the user device(s) 250. In this case, the user classifier 210 receives the classification of the user from the user devices(s).

In some embodiments, the classification is performed based on a history of previous classifications. For example, the history of previous classifications can be stored in a database and retrieved to classify the user; e.g., the user ID can be previously mapped based on previous classifications.

User request processor 220 is generally responsible for receiving user request properties of the user. For example, when the user requests access to the service or interacts with the service, properties of the user request can be sent with the request to the service. User request processor 220, with user classifier 210, can use the user request properties of the user to classify the user as a human agent or non-human agent. Examples of user request properties include an internet protocol (IP) address of the user device 250, a location of the user device 250, a location of the user, user agent type, and an ID associated with the user device 250. The aforementioned list of user request properties is not exhaustive and can be any property that is associated with the user request. For example, user request properties also include historical data and data from multiple users.

Sensor data monitor 230 is generally responsible for receiving data from one or more sensors of the user device 250. When a user interacts with the user device 250, data on the interaction is sent to the sensor data monitor 230. Sensor data monitor 230, with user classifier 210, can use the sensor data of the user to classify the user as a human agent or non-human agent. In some embodiments, the data includes the type of interaction and other properties of the interaction. For example, if a user moves a pointer, a sensor of the user device 250 can detect the movement and send data on the movement of the pointer to sensor data monitor 230. Other examples of pointer data include patterns of key presses and pointer movement, timing of the key presses, direction and speed of pointer movement. A sensor can detect interactions of a user with the sensor or other interactions of the user with the user device. For example, a sensor can be a camera that captures movement of the user.

User device 250 includes input devices and sensors (not shown). User device 250 can also include a content viewer 252. Content viewer 252 allows content to be viewed on user device 250. Based on the classification of the user, content can be displayed differently by content viewer 252.

Figure 3:
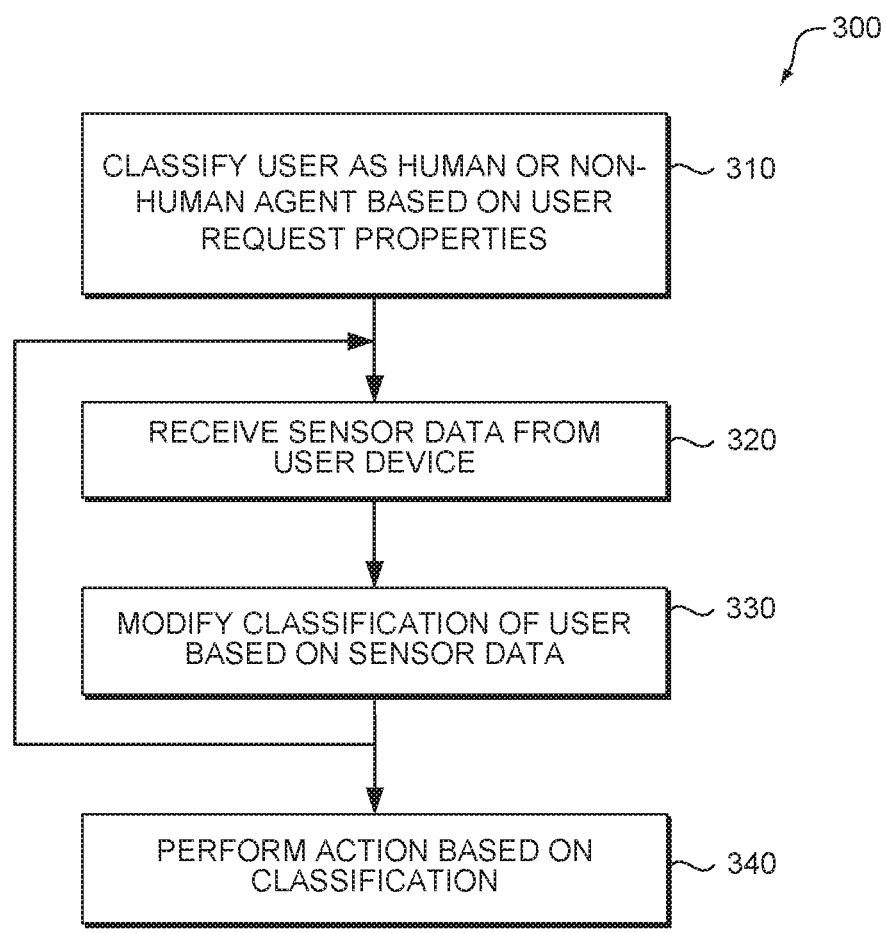
FIGS. 3 and 4 depict flow diagrams of methods for automatic detection of human and non-human activity, in accordance with embodiments of the present disclosure.

Turning to FIG. 3, a flow diagram is provided illustrating one example method 300 for determining whether a user is a human agent or a non-human agent. In one embodiment, method 300 may be carried out as a cloud-based process or a distributed computing process, using one or more servers or other computing devices. Each block or step of method 300, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a stand-alone application, a service or hosted service (stand-alone or in combination with another hosted service), or a plug-in to another product, to name a few.

At step 310, a user is classified as a human or non-human agent based on user request properties. For example, a user request property can be a browser identifier, e.g., a type and version of a web browser. The type and version of a browser may be used to determine wither the user is a human agent or a non-human agent. For example, a human agent is more likely to have a latest version of a browser or a popular type of browser. A non-human agent, on the other hand, is more likely to use a non-secure browser or an older version of a browser. An IP address that is blacklisted or is from a geographic location that is more likely to host non-human agents may be indicative a non-human agent. Other examples of user request properties include a time of day, location of the user device, screen size. In some embodiments, historical information is also used to classify the user as a human agent or non-human agent. Examples of historical information include search queries, rate of queries, location of the user device, and previous classifications of the user as a human agent or non-human agent. The user request properties can be used to provide a score or value that is used to classify the user as a human agent or non-human agent.

In some embodiment, based on the initial classification, a service can be configured. For example, if a user is classified as a non-human agent, the user may be blocked from a service or otherwise provided a different quality of service than what would be provided to a human agent.

It should be understood that the classification is not limited to a human agent or non-human agent and can be include multiple other classifications. Furthermore, the classification be can a probability or likelihood that the user is a human agent and the service can be configured based on the probability.

In some embodiments, the user request properties are received from a user device. Additional user request properties are inferred from user request properties. For example, instead of receiving a location of the user as a user request property, the location can be inferred from an IP address. Both the inferred user request properties and received used request properties can be used to classify the user is classified as a human or non-human agent.

At step 320, sensor data is received from the user device. For example, the sensor data can include pointer data, keyboard data, microphone data, and camera data. When a sensor detects an activity of the user, the user device can send the sensor data. In some embodiments, sensors capture actual interactions of the user with the user device and return data on the actual interactions. Thus, the sensor data can differ from programmatic event data, and can be used to further distinguish a human agent from a non-human agent.

In some embodiments, sensor data can detect pointer movement, typing, or active scrolling. In some embodiments, raw sensor data is collected, allowing human interaction with the user device and programmatic simulation of human activity to be distinguished.

In some embodiments, sensor data includes active content on the user device. For example, the sensor data can include presently displayed content of a display area of the user device, such as what content is centered on the display area of the user device.

In some embodiments, the sensor data is further analyzed to distinguish between human activity and non-human activity. For example, the speed of keyboard presses or overly regular movement of a pointer may be indicative of a non-human agent.

At step 330, the classification of the user is modified based on the sensor data. For example, if the sensor data includes movement captured by a camera, the data may be indicative of a human agent, and thus, the user can be classified as a human agent. The sensor data can be any data that is indicative of a human or non-human agent's interaction with a user device. For example, the sensor data can include camera data, microphone data, keyboard data, pointer data, and accelerometer data, among others. In some embodiments, the sensor data also includes state data and the history of classification and interactions with the sensors.

In some embodiments, the classification of the user is performed using rules. It should be understood that the classification is not limited to using rules and can be performed by, e.g., machine learning.

In some embodiments, the classification of the user is performed continuously throughout the user session. Thus, sensor data is continuously received and a classification can be modified with the sensor data. Based on the classification, the quality of service can be modified. Thus, for example, throughout a user session, the classification and quality of service can be updated a number of times based on the sensor data. In some embodiments, if a user is classified as a human agent, sensor data need not be collected for a predetermined time interval based on the score assigned to the classification. Thus, activities that are perceived as non-human may not be collected or ignored. In some embodiments, a threshold is used for the classification of the user as a human agent or non-human agent.

At step 340, an action is performed based on the classification. For example, if the user is initially classified as a human agent, the sensor data may indicate that the user is likely a non-human agent and the user may be reclassified as a non-human agent. Thus, the user may be prevented from accessing a service or a service can be adapted based on the classification. Alternatively, if the user is classified as a human agent, the user may receive access to a service or the service can be differently adapted for the human agent.

In some embodiments, a different tier of service can be provided to human agent and a non-human agent. For example, a human agent can receive content that has robust multimedia content. On the other hand, a non-human agent may receive text-only content.

In some embodiments, the quality of service is proportionate to the likelihood that the user is a human agent. For example, a user that is classified as a human agent can be provided a full quality of service. A user that his classified as likely to be a human agent can be provided a lower quality of service somewhat between that of a human agent and a non-human agent. Thus, the different qualities of service can be provided based on the confidence of the classification. In some embodiments, a probability that the user is a human agent is calculated and a quality of service is provided based on the probability.

In some embodiments, the user classification is performed at a regular interval. In some embodiments, if a user is classified as human agent, the user classification may not be performed for a predetermined interval or may not be performed at all.

By automatically classifying the user as a human agent upon detection of activity indicative of a human agent allows a service provider to determine whether a user is a human agent or non-human agent with a higher level of confidence. Thus, the service provider can optimally allocate resources to human agents and non-human agents. Furthermore, the classifications may change for a user, allowing for refinement of the classification during a user session. In addition, by automatically classifying a user as a human agent or non-human agent during the user session, a user is not provided an intrusive verification mechanism. There are costs associated with misclassification of users as a human agent or non-human agent and automatically classifying users as a human agent or non-human agent can help to minimize the cost by dynamically changing the classification of the user in real-time. Ensuring that the user is correctly classified is important to web sites where the cost of misclassifying a human as a non-human agent may be non-trivial.

Figure 4:
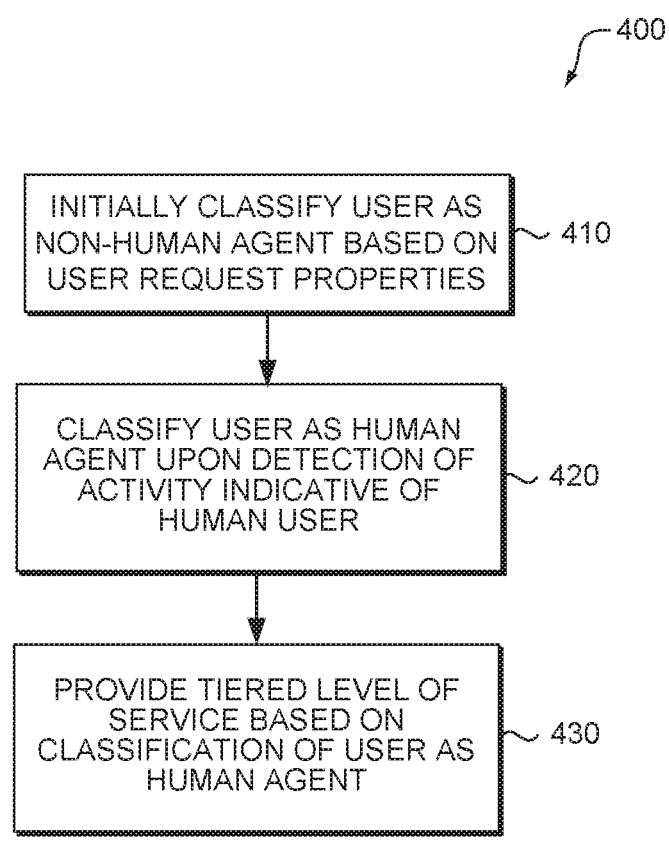

With reference now to FIG. 4, a flow diagram is provided illustrating one example method 400 for determining whether a user is a human agent or a non-human agent. In some embodiments, method 400 may be carried out on a computing device such as server 105 described in FIG. 1.

Accordingly, at step 410, a user is initially classified as a non-human agent based on user request properties. For example, a user's IP address may indicate that the user is likely a non-human agent. In some embodiments, the user device may provide an indication that the user is classified as a non-human agent. For example, the contents of a web page may change based on the classification of the user as a non-human agent.

At step 420, the user is classified as a human agent upon detection of activity indicative of a human user. For example, a pointer movement can be detected. As another example, a sensor tracking eye movement can detect the movement of the user's eyes on the page and classify the user as a human agent.

At step 430, the user is provided a tiered quality of service based on the classification of the user as a human agent. Since the user is classified as a human agent, the user may not detect any change in service, thus preserving the user's experience.

In some embodiments, a user detected as non-human agent that is reclassified in real-time causes the service level to be change to a higher tier and is updated to reflect the new higher quality of service. For example, a web search engine may refresh the results and features on a page if the user is classified as human agent based on sensor data, such as mouse or cursor movement.

Accordingly, various aspects of technology directed to systems and methods for determining whether a user is a human agent or a non-human agent are described. It is understood that various features, sub-combinations, and modifications of the embodiments described herein are of utility and may be employed in other embodiments without reference to other features or sub-combinations. Moreover, the order and sequences of steps shown in the example methods 300 and 400 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 5:
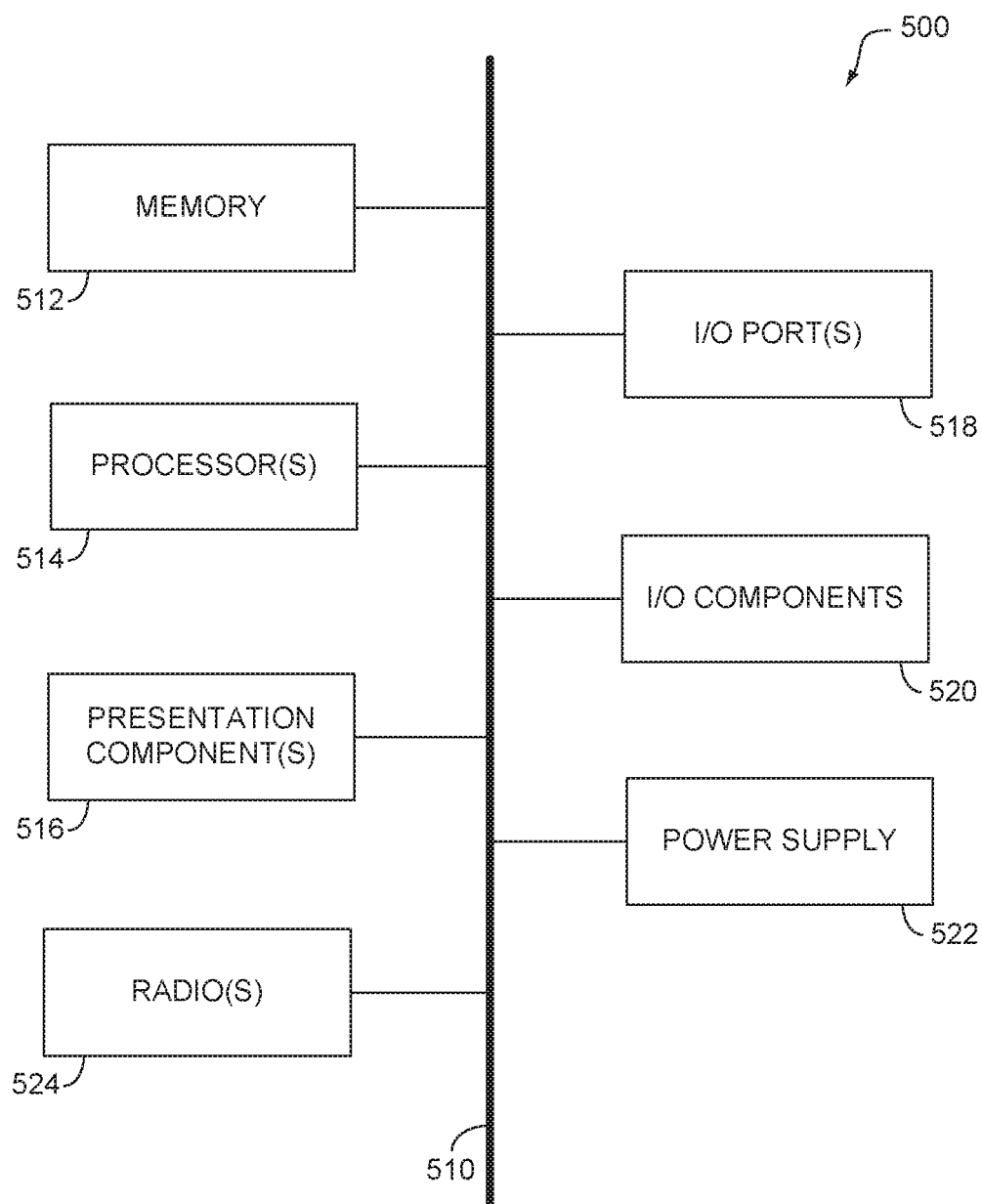
FIG. 5 is a block diagram of an exemplary computing environment suitable for use in implementing an embodiment of the present disclosure.

Having described various implementations, an exemplary computing environment suitable for implementing embodiments of the disclosure is now described. With reference to FIG. 5, an exemplary computing device is provided and referred to generally as computing device 500. The computing device 500 is but one example of a suitable computing environment and is not intended to suggest any limitation as to the scope of use or functionality of embodiments of the disclosure. Neither should the computing device 500 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 5, computing device 500 includes a bus 510 that directly or indirectly couples the following devices: memory 512, one or more processors 514, one or more presentation components 516, one or more input/output (I/O) ports 518, one or more I/O components 520, and an illustrative power supply 522. Bus 510 represents what may be one or more busses (such as an address bus, data bus, or combination thereof). Although the various blocks of FIG. 5 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 5 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 5 and with reference to "computing device."

Computing device 500 typically includes a variety of computer-readable media. Computer-readable media can be any available media that can be accessed by computing device 500 and includes both volatile and nonvolatile, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 512 includes computer storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors 514 that read data from various entities such as memory 512 or I/O components 520. Presentation component(s) 516 presents data indications to a user or other device. Exemplary presentation components include a display device, speaker, printing component, vibrating component, and the like.

The I/O ports 518 allow computing device 500 to be logically coupled to other devices, including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as stereoscopic camera systems, infrared camera systems, RGB camera systems, and combinations of these, for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

Some embodiments of computing device 500 may include one or more radio(s) 524 (or similar wireless communication components). The radio 524 transmits and receives radio or wireless communications. The computing device 500 may be a wireless terminal adapted to receive communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

Embodiment 1

A system comprising: a user request processor, the user request processor receiving user request properties of a user, the user request properties being used to classify a user as a human agent or non-human agent; a sensor data monitor, the sensor data monitor receiving sensor data from a user device, the sensor data being used to classify the user as a human agent or non-human agent; and a user classifier to classify the user as a human agent or non-human agent based on the user request processor and sensor data monitor, the user being granted access to a quality of service based on the classification.

Embodiment 2

The system of embodiment 1, wherein the user request properties comprises at least one of an internet protocol (IP) address, a browser identifier, or a location of the user device.

Embodiment 3

The system of any of embodiments 1-2, wherein the user request properties comprises one or more previous classification classifications of the user as a human agent or non-human agent.

Embodiment 4

The system of any of embodiments 1-3, wherein the user request processor further receives at least one of historical data of the user or data from multiple users.

Embodiment 5

The system of any of embodiments 1-4, wherein the sensor data comprises data indicative of whether one or more keys of a keyboard are pressed or whether a pointer is moved and clicked.

Embodiment 6

The system of any of embodiments 1-5, wherein the sensor data comprises camera data.

Embodiment 7

The system of any of embodiments 1-6, wherein classifying the user as a human agent or non-human agent comprises calculating a score based on the user request properties and sensor data and reclassifying the user as a human agent when the score exceeds a threshold.

Embodiment 8

The system of any of embodiments 1-7, wherein the user classifier reclassifies the user as a human agent upon receiving sensor data indicative of a human agent.

Embodiment 9

A system comprising: one or more processors; and computer storage memory having computer-executable instructions stored thereon which, when executed by the processor, determines whether a user is a human agent or a non-human agent, comprising: classify the user as a human agent or non-human agent based on received user request properties; receiving sensor data from a user device of the user; modifying the classification of the user based on the sensor data; and performing an action based on the classification.

Embodiment 10

The system of embodiment 9, wherein the user request properties are used to provide an initial classification of the user as a human agent or non-human agent.

Embodiment 11

The system of embodiment 10, wherein the sensor data is used to modify the initial classification of the user.

Embodiment 12

The system of any of embodiments 9-11, wherein the sensor data comprises data indicative of whether one or more keys of a keyboard are pressed.

Embodiment 13

The system of any of embodiments 9-12, wherein the sensor data is continuously received from the user device.

Embodiment 14

The system of any of embodiments 9-13, wherein the instructions further comprise, when the user is classified as a human agent, prevent modification of the user as a non-human agent for a predetermined interval.

Embodiment 15

The system of any of embodiments 9-14, wherein the instructions further comprise calculating a score for the used from the sensor data and reclassifying the user as a human agent when the score exceeds a threshold.

Embodiment 16

A computer-performed method for determining whether a user is a human agent or a non-human agent, the method comprising: initially classifying the user as a non-human agent based on one or more user request properties; receiving sensor data from a user device of the user indicative of a human agent; reclassifying the user as a human agent based on the sensor data; and maintaining a tier of service to the user based on the reclassification.

Embodiment 17

The method of embodiment 16, wherein the sensor data is continuously received, and wherein the method further comprises reclassifying the user and updating the tier of service based on the continuously received sensor data.

Embodiment 18

The method of any of embodiments 16-17, wherein the user request data comprises at least one of an internet protocol (IP) address, a type and version of a browser, or a location of the user device.

Embodiment 19

The method of any of embodiments 16-18, wherein the method further comprising providing a tier of service based on the reclassifying the user as non-human user; and the maintaining a tier of service comprises providing a same tier of service as the initial classification of the user as a human agent.

Embodiment 20

The method of any of embodiments 16-19, wherein the sensor data comprises one or more of pointer and keyboard interaction data, content displayed to the user, and scrolling data.

What is claimed is:

1. A system comprising:
    one or more processors; and
    computer storage memory having computer-executable instructions stored thereon which, when executed by the one or more processors, are configured to implement a method for determining whether a user is a human agent or a non-human agent, the method comprising:
    classifying the user as the human agent or the non-human agent based on received user request properties;
    receiving sensor data from a user device of the user;
    modifying the classification of the user based on the sensor data;
    based on classifying the user as the human agent, preventing modification of the user as the non-human agent for a predetermined interval; and
    performing an action based on the classification.

2. The system of claim 1, wherein the user request properties are used to provide an initial classification of the user as the human agent or the non-human agent.

3. The system of claim 2, wherein the sensor data is used to modify the initial classification of the user.

4. The system of claim 1, wherein the sensor data comprises data indicative of whether one or more keys of a keyboard are pressed.

5. The system of claim 1, wherein the sensor data is continuously received from the user device.

6. The system of claim 1, wherein the method further comprises calculating a score for the user from the sensor data and reclassifying the user as the human agent when the score exceeds a threshold.

7. A computer-performed method for determining whether a user is a human agent or a non-human agent, the method comprising:

initially classifying the user as the non-human agent based on one or more user request properties;

receiving sensor data from a user device of the user indicative of the human agent;

reclassifying the user as the human agent based on the sensor data; and preventing modification of the user as the non-human agent for a predetermined interval and maintaining a tier of service to the user based on the reclassification.

8. The method of claim 7, wherein the sensor data is continuously received, and wherein the method further comprises reclassifying the user and updating the tier of service based on the continuously received sensor data.

9. The method of claim 7, wherein the user request properties comprise at least one of an internet protocol (IP) address, a type and version of a browser, or a location of the user device.

10. The method of claim 7, wherein the sensor data comprises one or more of pointer and keyboard interaction data, content displayed to the user, and scrolling data.

11. The method of claim 7, wherein the tier of service that is maintained based on the reclassification of the user as the human agent is higher than a tier of service that is provided based on classification as the non-human agent.

12. A system comprising:
one or more processors; and
computer storage memory having computer-executable instructions stored thereon which, when executed by the one or more processors, are configured to implement a method comprising:
classifying a user as a human agent or a non-human agent based on received user request properties,
receiving sensor data from a user device of the user;
modifying the classification of the user based on the sensor data;
based on classifying the user as the human agent, preventing modification of the user as the non-human agent for a predetermined interval; and
performing an action based on the classification.

13. The method of claim 11, wherein the higher tier corresponds to a higher quality of service.

14. The system of claim 12, wherein the user request properties comprise at least one of an internet protocol (IP) address, a browser identifier, or a location of the user device.

15. The system of claim 12, wherein the user request properties comprise one or more previous classifications of the user as the human agent or the non-human agent.

16. The system of claim 12, wherein the method further comprises receiving at least one of historical data of the user or data from multiple users.

17. The system of claim 12, wherein the sensor data comprises data indicative of whether one or more keys of a keyboard are pressed or whether a pointer is moved and clicked.

18. The system of claim 12, wherein the sensor data comprises camera data.

19. The system of claim 12, wherein classifying the user as the human agent or the non-human agent comprises calculating a score based on the user request properties and sensor data and reclassifying the user as the human agent when the score exceeds a threshold.

20. The system of claim 12, wherein the method further comprises reclassifying the user as the human agent upon receiving sensor data indicative of the human agent.

* * * * *